Sept. 4, 1928.
W. A. RIDDELL
SHUTTER CASING
Filed July 21, 1925
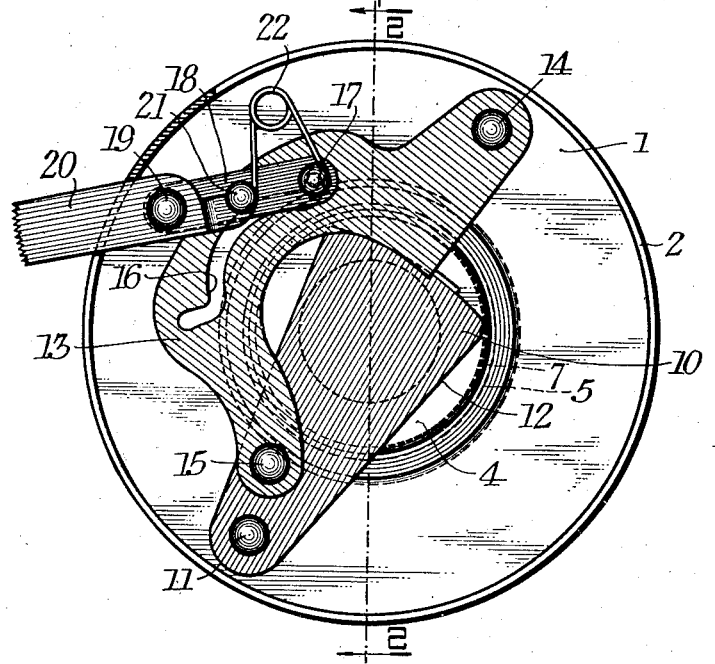
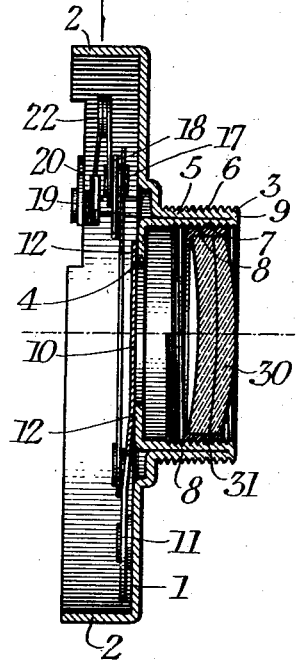
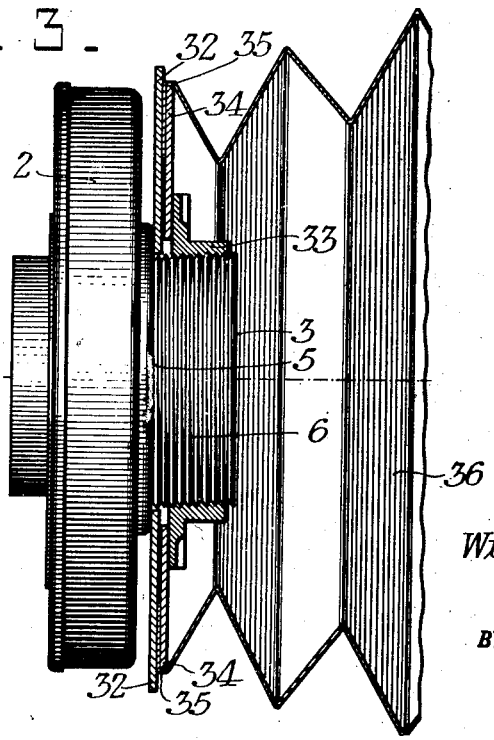
William A. Riddell,
INVENTOR.
BY
ATTORNEYS.

Patented Sept. 4, 1928.

1,683,303

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

SHUTTER CASING.

Application filed July 21, 1925. Serial No. 45,129.

This invention relates to photography, and more particularly to photographic shutters. One object of my invention is to produce a shutter casing which may be made of relatively thin light metal reinforced for strength at necessary places. Another object is to provide an annular shutter casing having a rearwardly extending lens tube formed of a double thickness of metal. Another object is to provide a shutter casing with a lens tube, as above described, with an inwardly extending flange lying in substantially the same plane as the base plate of the shutter casing, thus providing an additional area for supporting the shutter mechanism. Another object is to provide a shutter blade supporting member which is integral with the shutter casing and extends inside of the lens tube, and other objects will appear from the following specification, the novel features being particularly pointed out in the claims at the end thereof.

In the drawings, wherein like reference characters denote like parts throughout:—

Fig. 1 is a plan view of a typical shutter with the shutter cover removed having a casing constructed in accordance with, and illustrating one embodiment of my invention;

Fig. 2 is a section on line 2—2 of Fig. 1; and

Fig. 3 is a side elevation of the assembled shutter attached to a camera lens board, the fragmentary showing of the lens board and bellows being in section.

I have shown, by way of illustration, a simple shutter of the type shown in my co-pending application for photographic shutters, Serial No. 741,036, filed Oct. 1, 1924. While the subject matter of the present application is particularly adapted for use with this simple shutter, it is also equally suitable for use with shutters of different types, particularly those in which the shutter casing is made of relatively thin metal and is provided with a tubular member for supporting the camera objective.

In Fig. 1, I have shown only the essential parts of the shutter. The shutter casing comprises an annular base plate 1 provided with a flange 2 extending from the periphery of the base plate, and a rearwardly extending lens tube 3. This lens tube is formed from the metal from which the base plate is made, and consists of a double walled tubular member having a flange 4 extending from the inner edge of the tube in substantially the same plane as that of the base plate 1. Thus, the area of the base plate 1 is, in effect, increased by the area of flange 4. The outer tubular member 5 is provided with a thread 6 and the inner tubular member 7 is provided with interior threads 8. The tubular members are formed of the same piece of metal, tube 5 being bent upon itself at 9 so that a wall of tube 7 will lie against tube 5, thus forming a very rigid lens tube. It should be particularly noted that only one piece of metal is employed in making the shutter casing above described. The base plate 1, flange 2, double wall lens tube 3, and flange 4 are all structurally integral.

The shutter mechanism is supported upon the base plate. In the present instance, the shutter leaf 10 is carried by a pivot 11 which passes through into base plate 1. The shutter leaf 10 lies against and forms a substantially light-tight connection with the flange 4 at 12. The master member 13 is pivoted to the shutter casing upon a stud 14, and there is a stud 15 pivotally attaching the master member to the shutter blade. The master member is provided with a cam slot 16, in which a stud 17 may travel, stud 17 being carried by link 18 which is pivoted upon a stud 19 carried by the shutter casing. This stud also supports the exposure lever 20. One end of the exposure lever carries a stud 21 which supports one end of a hairpin spring 22. The opposite end of this spring encircles stud 17. When the exposure lever 20 is moved in one direction, the link 18, through the action of spring 22, gives a back-and-forth movement to the master member 13, causing the shutter leaf 10 to swing to and from the position shown in full lines in Fig. 1.

The camera objective, in this case a simple meniscus achromatic lens 30, is carried in a cell 31 which may be screwed into the thread 8 of the lens tube. The shutter casing 1 may be fastened to the camera lens board 32 by means of a collar 33 which lies against the inside plate 34 of the lens board, the plates 32 and 34 also supporting at 35 one end of the bellows 36. Collar 33 screws on the threaded portion 6 of the lens tube.

With the construction above described relatively thin sheet metal may be used for the shutter casing. The lens tube is reinforced by being made of a double thickness of metal, thus permitting a relatively coarse thread to be used for both the shutter retaining collar 33 and the objective collar 31. In addition to providing a reinforced lens tube, the double thickness of metal also permits the flange 4 to be formed inwardly so as to, in effect, form an extension on the shutter base plate 2 so as to form a support for parts of the shutter mechanism.

The shutter casing comprising the base plate 1, flanges 2 and 4 and double walled lens tube 3 are all integral, being formed from a single sheet of metal. When the term "integral" appears in the following claims I mean this term to include only a "structurally integral" shutter casing and not one built up from a number of parts.

Having thus described my invention, what I claim as new and desire to secure by Letters Patent is:

1. In a photographic shutter, the combination with shutter mechanism, of a shutter casing for enclosing the shutter mechanism comprising an integral structure, said structure including an annular base plate, a flange extending around the periphery of the base plate and a double-walled tubular extension from the base plate between the flange and the aperture of the annular member, the walls of the double-walled tubular extension lying in contact whereby a reinforced tubular extension is provided.

2. In a photographic shutter, the combination with shutter mechanism, of a casing comprising an annular structure carrying the shutter mechanism and including an annular base plate, a tubular extension from the base plate including a pair of walls having contacting areas, a flange on the tubular extension in approximately the plane of the base plate, said flange forming a support for parts of the shutter mechanism.

3. In a photographic shutter, the combination with shutter mechanism, of a casing comprising an integral structure for the mechanism and including an annular base plate, a tubular extension from the base plate including a pair of walls having contacting areas and a flange formed from the end of the tubular member and lying in a plane parallel to the plane of the base, said flange serving as a support for parts of the shutter mechanism.

4. In a photographic shutter, the combination with shutter mechanism, including a shutter leaf, of a casing comprising an integral structure for the mechanism and including an annular base plate, a tubular extension from the base plate including a pair of walls having contacting areas and a flange formed on the end of the tubular member said flange lying in a plane parallel to the plane of the base, said flange forming a slideway supporting the shutter leaf when the shutter mechanism is in a closed position.

5. A photographic shutter casing comprising a one-piece integral structure including an annular base plate, a flange extending in one direction from the periphery of the annular plate, a double-walled tubular member extending from the inner edge of the annular member, and a flange extending from an end of one of the double-walled tubular members lying in a plane parallel to the plane of the annular base plate.

6. A photographic shutter casing comprising an integral structure including an annular base plate having a double-walled tubular extension from the base plate between the inside and outside peripheries of the annular base plate, the walls of the tubular member having contacting areas.

7. In a photographic shutter, the combination with shutter mechanism, of an annular plate for supporting the shutter mechanism, and an integral tubular extension from the base plate including two walls having contacting areas, said tubular extension being of greater diameter than the opening of the annular member, whereby a reinforced objective holding tube is provided.

8. In a photographic shutter, the combination with shutter mechanism, of a one-piece integral housing therefor, including an apertured base plate, an extension from the base plate comprising two contacting walls adapted to support the camera objective, said extension being larger in cross section than the aperture of the base plate.

9. A photographic shutter casing, comprising a relatively flat base plate made from one piece of metal in two sections, and a double-walled integral extension formed by the two-piece sections, and the other wall of the extension being carried by the other section of the base plate, the two base plate sections being joined together by the double-walled extension.

Signed at Rochester, New York, this 17th day of July 1925.

WILLIAM A. RIDDELL.